S. KOHN.
FILM REEL.
APPLICATION FILED FEB. 13, 1919.
1,307,554.
Patented June 24, 1919.
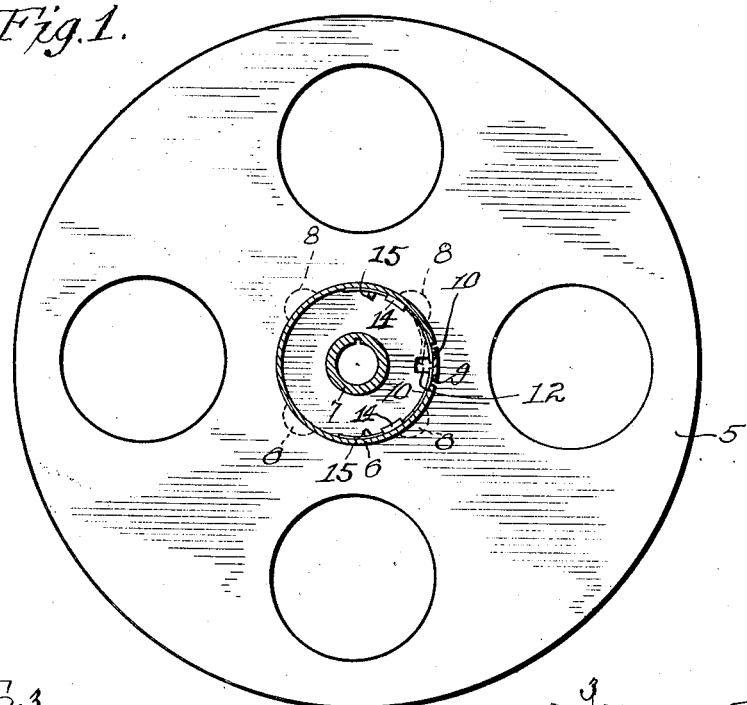
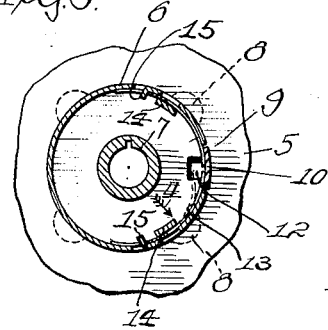
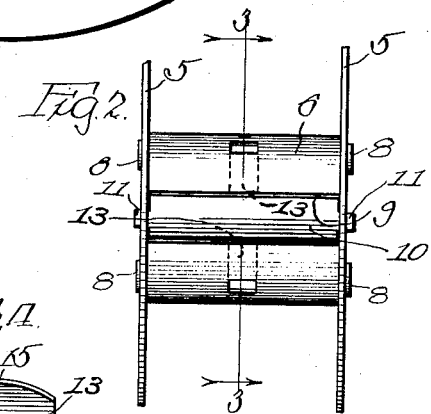
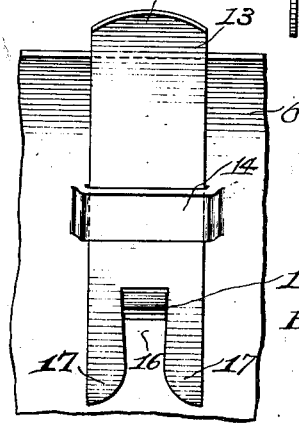
Witness:
Inventor:
Samuel Kohn,
By Brown & Nissen
Attys.

UNITED STATES PATENT OFFICE.

SAMUEL KOHN, OF CHICAGO, ILLINOIS.

FILM-REEL.

1,307,554.

Specification of Letters Patent.　Patented June 24, 1919.

Application filed February 13, 1919. Serial No. 276,804.

*To all whom it may concern:*

Be it known that I, SAMUEL KOHN, a citizen of the United States, residing at Chicago, in the county of Cook and State of Illinois, have invented certain new and useful Improvements in Film-Reels, of which the following is a specification.

My invention relates to film reels, and has for one of its objects the provision of a simple and efficient locking device for film reels for securely holding a film end and adapted for quickly and easily attaching and detaching said film end.

A further object is the provision of two short springs to take the place of the one long spring in the improvement described in my United States Patent No. 1,267,773, granted May 28, 1918.

Other objects will appear hereinafter.

An embodiment of my invention is illustrated in the accompanying drawing, forming a part of this specification, and in which—

Figure 1 is a central section of a film reel embodying my invention.

Fig. 2 is an edge view of such a film reel showing portions broken away.

Fig. 3 is a fragmental section taken on line 3—3 of Fig. 2; and

Fig. 4 is an enlarged fragmental view looking in the direction of the arrow 4 in Fig. 3.

In the drawing I have shown my improved spring associated with one form of locking member, but it will be understood that these springs may be associated with any of the locking members shown in my above-mentioned patent, or any other similar locking member.

In the drawing, I have indicated a film reel as being made up of end plates 5, having a hub 6, and a tubular member 7 securing the end plates 5. It will be understood that the hub 6 and tube 7 may be secured to the end plates in any desirable manner. I have indicated ears 8 as being formed on the hub 6 and passing through the end plates to secure the end plates in position.

In the hub 6 I have shown an opening 9 with a locking member 10 in said opening adapted to operate therein in a manner similar to that set forth in my above-mentioned patent. The locking member 10 is provided with ears 11 which pass through openings 12 in the end plates. The openings 12 engaging the ears 11 hold the locking member in position, and when it is desired to engage a film end with the locking member, the ears 11 are pressed toward the axis of the reel to permit the end of a film, not shown, to be inserted between one edge of the locking member 10 and an adjacent edge of the hub 6, the resilient means within the hub pressing the locking member outwardly to clamp the film end. It will be apparent that a film may be wound on the reel in either direction and one of its ends engaged by one edge of the locking member 10 and an adjacent edge of the hub.

In my former patent above mentioned, I provided a single spring with the ends engaging the locking member to hold the latter in position. In the present improvement I provide two relatively short springs 13 secured to the inner side of the hub with their ends engaging the under side of the locking member 10. The springs 13 may be secured in any desirable manner. I have shown an efficient means for detachably securing these springs by providing loops 14 cut out and struck up in the hub 6 and extending inside of the latter. The loops 14 are preferably formed so that the springs 13 will slip through them easily without much play. An effective means for holding the springs against longitudinal movement is to provide projections 15 on the inside of the hub 6 and form slots 16 in ends of the springs with the ends of the slots adjacent the ends of the springs narrower than the ends of the slot adjacent the bottom of the latter. This particular relation between the slot and prongs 17 of the springs adjacent the slot permits the prongs 17 to spring apart when the springs are slid by projections 15 longitudinally into position through the loops 14. As soon as the narrow portions of the slots pass by the projections 15, the projections engage the bottom of the slot where the latter is wider. The slots 16 and projections 15 are preferably provided in sizes so that by grasping an end of a spring 13 with a pair of pliers, not shown, the spring can be easily moved through a loop 14 into locking engagement with a projection 15 and not be easily removable without the use of pliers, or similar tool. This provides a means for quickly and easily changing or removing the springs 13, when so desired, and yet holding them effectively in position for use,

I claim:—

1. A film reel comprising a hub having an opening in the side thereof; a resilient film lock frictionally held in engagement with the hub with one end extending into the opening of said hub; and a member in said hub holding the resilient lock against longitudinal movements.

2. A film reel comprising a hub having an opening in the side thereof; a loop and a projection on the inside of the hub; and a film lock in the hub and frictionally engaging said loop and projection.

3. A film reel comprising a hub having a sheet of material disposed in tubular form with an opening in the side thereof; a loop and a projection struck up and extending inside of the hub; and a resilient film lock disposed under said loop and having a portion frictionally secured to said projection.

4. A film reel comprising a hub having a sheet of material disposed in tubular form with an opening in the side thereof; a loop and a projection struck up and extending inside of the hub; and a resilient film lock disposed under said loop and having a bifurcated end engaging said projection.

5. A film reel comprising a hub having a sheet of material disposed in tubular form with an opening in the side thereof; a loop and a projection struck up and extending inside of the hub; and a resilient film lock disposed under said loop and having a bifurcated end engaging said projection with the distance between the end portions of the bifurcated parts greater than the distance between the base portions of said bifurcated parts.

6. A film reel comprising a hub having a sheet of material disposed in tubular form with an opening in the side thereof; a loop and a projection struck up and extending inside of the hub; and a resilient film lock extending through said loop and having one end bifurcated and engaging said projections with the adjacent edges of the bifurcated parts tapering toward the ends of the latter for holding the film lock against removal from said hub.

7. A film reel comprising a hub having a sheet of material disposed in tubular form with an opening in the side thereof; a loop and a projection struck up and extending inside of the hub; and an elongated resilient film lock of sheet material extending through said loop and having a slot extending into end thereof, said slot being wider adjacent its inner end and narrower adjacent the end of said film lock with said slot engaging said projection.

8. A film reel comprising a hub of sheet material disposed in substantially cylindrical form with an opening in the side thereof; a resilient film lock frictionally held in engagement with the inside of the hub at each side of said opening with one end of each of the film locks extending into said opening, said end of each film lock being adapted for movement toward the center of the hub without disturbing the other film lock.

In testimony whereof I have signed my name to this specification on this 11th day of February A. D. 1919.

SAMUEL KOHN.